United States Patent [19]

Lohrmann

[11] 4,060,767
[45] Nov. 29, 1977

[54] SELF TEST CIRCUIT FOR MULTICHANNEL RADIO RECEIVERS

[75] Inventor: Dieter Lohrmann, Lanham, Md.

[73] Assignee: The United States of America as represented by the Secretary of the Army, Washington, D.C.

[21] Appl. No.: 740,568

[22] Filed: Nov. 10, 1976

[51] Int. Cl.² .............................................. H04B 17/00
[52] U.S. Cl. ...................................... 325/363; 325/67; 332/17
[58] Field of Search ........................... 325/363, 31, 67; 328/16; 332/14, 17; 179/15 BM

[56] References Cited

U.S. PATENT DOCUMENTS

| | | | |
|---|---|---|---|
| 3,406,343 | 10/1968 | Mehlman | 332/17 |
| 3,602,819 | 8/1971 | Abbott | 325/363 |
| 3,605,022 | 9/1971 | De Fillipo | 325/363 |

Primary Examiner—Robert L. Griffin
Assistant Examiner—Michael A. Masinick

Attorney, Agent, or Firm—Nathan Edelberg; Jeremiah G. Murray; Edward Goldberg

[57] ABSTRACT

A simultaneously amplitude modulated and frequency-/phase modulated harmonic signal generator incorporated in a multichannel AM-FM radio receiver which will indicate to the operator whether or not the receiver is sensitive and is operative to receive signals within any of a plurality of designated channels. The circuit includes a transistor switch which is periodically driven on and off by means of an input signal having a frequency equal to the channel spacing of the receiver and being further controlled by means of an audio frequency signal which is adapted to further modulate the turn-on point of the transistor switch. The signal appearing at the collector of the transistor is fed through a high pass filter to the receiver input as an AM and FM waveform which contains a harmonic at every channel of the receiver and thereby providing a self testing function for the receiver.

12 Claims, 3 Drawing Figures

SELF TEST CIRCUIT FOR MULTICHANNEL RADIO RECEIVERS

The invention described herein may be manufactured and used by or for the Government for governmental purposes without the payment of any royalties thereon or therefor.

BACKGROUND OF THE INVENTION

This invention relates generally to test equipment for radio apparatus and more particularly to means for self testing modern multichannel radio receivers.

A typical multichannel radio receiver which includes digital frequency synthesizing circuitry may have a frequency range of, for example, from 30 to 80MHz with a multitude of frequency channels equally spaced 25kHz apart. It becomes desirable that the operator be provided with an indication of whether or not his receiver is sensitive and receives signals within any of the designated channels. Accordingly, a simple test circuit is disclosed herein which provides both amplitude and frequency modulated carriers simultaneously at each and every channel frequency of the receiver for self testing the receiver with which it is incorporated.

SUMMARY

Briefly, the subject invention comprises a self test circuit for a multichannel AM-FM radio receiver having equal channel frequency spacings and includes a rectangular wave signal source producing an output waveform having a frequency equal to the channel spacing of the receiver. The rectangular waveform is fed to circuit means which is adapted to alter the steep leading edge of the waveform to a relatively lower rise time which is applied to a base of a transistor switch which is normally biased non-conductive, but becoming conductive at a predetermined point of the slower rise time waveform. The point at which the transistor becomes conductive is further modulated by means of an audio frequency source coupled to the emitter of the transistor. The waveform of the collector voltage accordingly becomes a rectangular waveform whose amplitude and leading edge is simultaneously varied in accordance with the audio frequency applied. The collector waveform is passed through a high pass filter or differentiator circuit which provides an output waveform in the form of an amplitude and FM modulated pulse signal containing a harmonic at every channel of the receiver.

DESCRIPTION OF THE PREFERRED EMBODIMENT

Figure 1:
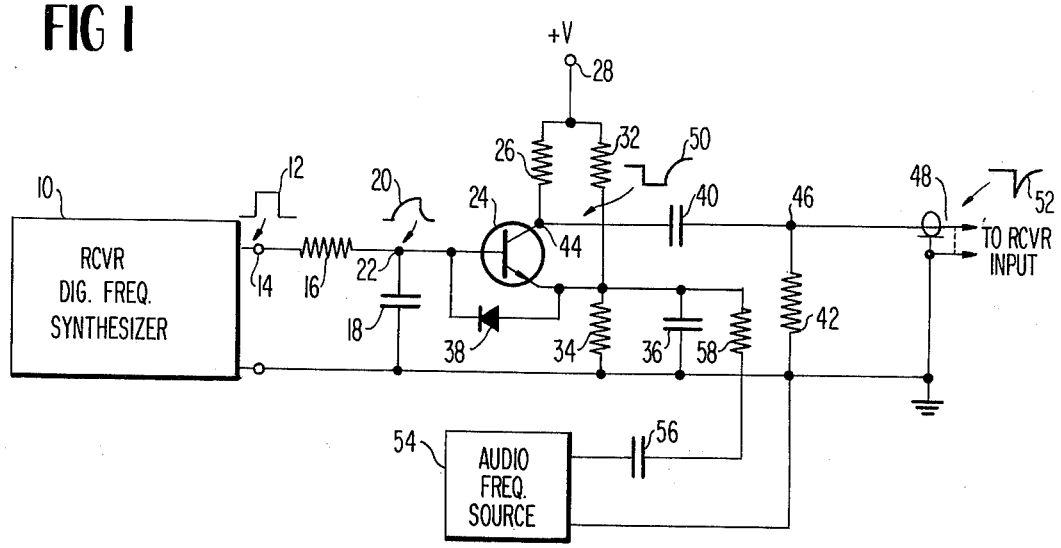
FIG. 1 is an electrical schematic diagram illustrative of the preferred embodiment of the subject invention.

Referring now to the drawings and more particularly to FIG. 1, reference numeral 10 designates a rectangular waveform generator providing an output frequency $f_s$ which is provided, for example, by means of a digital frequency synthesizer present in a multichannel AM-FM receiver having a channel spacing $f_s$ between a plurality of operating frequencies. When desirable, however, the source 10 may be comprised of a simple crystal controlled oscillator of a fixed frequency $f_s$. If, for example, the radio receiver with which the subject invention is utilized has a frequency range from 30 to 80MHz with discrete operating channels at 30.000, 30.025, and 30.050MHz, an $f_s$ = 25kHz rectangular waveform 12 is provided at terminal 14.

Figure 2:
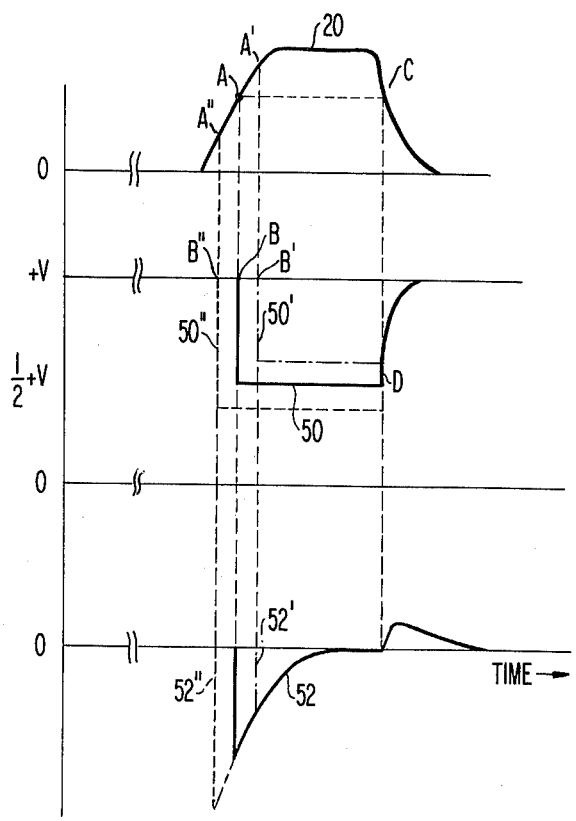
FIG. 2 is a set of time related illustrated waveforms provided by the circuitry shown in FIG. 1.

The waveform 12 is coupled to the combination of a resistor 16 and a capacitor 18 having an RC time constant which is adapted to alter the steep flanks i.e. rise and fall times of the waveform 12 to provide a relatively lower rise time waveform 20 at circuit junction 22, which is further depicted in FIG. 2. When desirable, the resistor 16 may be included in the output impedance of the generator 10. The resistor-capacitor combination of elements 16 and 18 is often referred to as a pulse stretcher or integrator. Circuit junction 22 is connected to the base of an N-P-N transistor 24 whose collector is coupled to a source of supply voltage +V through a load resistor 26 connected to supply terminal 28. The emitter of transistor 24 is connected to circuit junction 30 formed by means of two resistors 32 and 34 coupled between terminal 28 and ground and act as a voltage divider to provide a voltage at circuit junction 30 of approximately ½V.

Capacitor 36 is chosen such that at high frequencies it prevents emitter degeneration due to resistors 32 and 34 while having a sufficiently high impedance for audio frequencies so as not to be shorted out. A semiconductor diode 38 is coupled between the emitter and base and poled to conduct negative going voltages to ground through resistor 34.

A high pass filter circuit in the form of a capacitor 40 and a resistor 42 is coupled between the collector at junction 44 and ground to provide an output at junction 46 which is coupled to the receiver input, not shown, via a coaxial cable 48.

The capacitor-resistor combination of elements 40 and 42 is often referred to as a differentiator circuit and has the characteristic of differentiating the waveform 50 appearing at junction 44 to provide a pulse type of waveform 52. Both of these waveforms are furthermore shown in FIG. 2 and will be explained subsequently. Additionally, a signal source 54 providing for example an audio frequency tone signal of any desired waveform is coupled to circuit junction 30 by means of a coupling capacitor 56 and an amplitude limiting resistor 58.

In operation, transistor 24 becomes conductive when the voltage at the base exceeds the voltage on the emitter, typically 0.7V, in the manner well known to those skilled in the art. Accordingly, transistor 24 will become conductive as the voltage at the base rises above the voltage appearing at circuit junction 30, which is selectively determined to be ½+V, which if for example +V = +10V, the voltage at circuit junction 30 will be approximately +5V. Transistor 24 then will become conductive when the base voltage rises above the level of approximately +5.7 volts. The voltage at circuit junction 30, however, is further modulated, that is varied, around the DC level set by the voltage divider action of the resistors 32 and 34 by a signal coupled to circuit junction 30 from the audio frequency source 54. Assuming that source 54 comprises a sine wave source, the voltage at junction 30 will vary sinusoidally above and below the ½+V level.

Referring now to the waveforms shown in FIG. 2, waveform 20 which comprises the altered output waveform from the source 10 and which is applied to the base of transistor 24, causes the transistor to become conductive at point A in absence of any signal from the audio frequency source 54. The collector voltage waveform 50 at point B immediately drops from +V to approximately ½+V and will remain at that level until the transistor is again rendered non-conductive which is at point C of waveform 20 whereupon waveform 50 at point D again rises exponentially to the supply voltage +V.

The collector voltage waveform 50 is converted to a sawtooth waveform 52 by means of the action of the capacitor 40 and the resistor 42 which as noted above, operates a high pass filter or a differentiator. The significant characteristic about the waveform 52, however, is that since the frequency of the rectangular waveform 12 outputted from the synthesizer 10 is selectively chosen to be equal to the channel spacing of the receiver i.e. $f_s$, waveform 52 contains a harmonic at every channel of the receiver.

Figure 3:
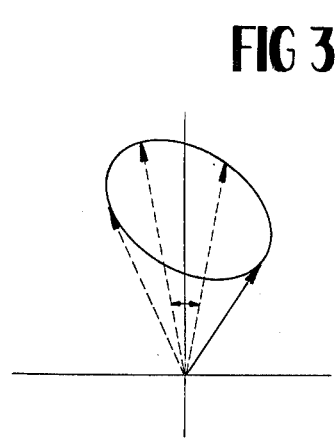
FIG. 3 is a modulation vector diagram of the output waveform of the circuitry shown in FIG. 1.

It can further be seen by reference to waveform 20 that the audio signal applied to circuit junction 30 causes the conduction point of the transistor to vary between points A' and A". This shift or jitter causes the waveform 50 also to be shifted in phase, that is phase modulated between points B' and B", while at the same time causing a change in amplitude or amplitude modulated as indicated by FIG. 2 which in turn results in amplitude modulated output pulse which is also frequency modulated as evidenced by waveforms 52' and 52". Since the output waveform 52 is both amplitude modulated and frequency or phase modulated simultaneously, a vector diagram of the modulation appears illustratively as shown in FIG. 3. The amount of jitter or deviation from point A of waveform 20 is dependent upon two factors, the first being the slope of the rise time characteristic which is dependent upon the RC time constant of resistor 16 and capacitor 18 and the amplitude of the audio signal from the source 54 appearing at circuit junction 30. The amplitude modulation index $M_a$ can be expressed by the following equation:

$$M_a = \frac{V_a}{V_{bb} - V_{eo}} \quad (1)$$

while the frequency modulation index $M_f$ can be expressed as:

$$M_f = 2\pi f_d \left[ \frac{(R_{16} \cdot C_{18})(V_b + V_d)V_a}{(V_{bb} - V_{eo})^2} \right] \quad (2)$$

where $f_d$ is the dial frequency, $V_{bb}$ equals the +V voltage applied to terminal 28, $V_{eo}$ is the DC emitter bias voltage at junction 30, $V_a$ is the peak audio voltage appearing on the emitter at circuit junction 30, $V_b$ is the base turn on voltage of the transistor, typically 0.7 volts, and $V_d$ is the turn on voltage of diode 38, typically 0.5 volts. In practice, one would first set the AM modulation index by selecting the amplitude of the audio voltage $V_a$ and then secondly set the FM modulation index by selection of the RC time constant of resistor 16 and capacitor 18.

Thus what has been shown and described is a simple, yet effective circuit which provides amplitude and simultaneously frequency modulated carriers at each and every channel frequency of the receiver which will tell the operator whether or not his receiver is sensitive and receives signals within any of the designated channels irrespective of whether FM or AM signals are received.

Having thus described what is at present considered to be the preferred embodiment of the subject invention, I claim:

1. A self test circuit providing a simultaneously amplitude modulated and frequency modulated carrier signal for each frequency channel of a multichannel radio receiver having a substantially equal frequency separation between channels, comprising in combination:

circuit means providing a periodic signal having a predetermined sloping leading edge adapted to control the operating state of an electronic switch device and having a frequency equal to the frequency separation between channels;

an electronic switch device operable between first and second operating states coupled to said circuit means and being driven into one of said operating states by said periodic signal;

bias means coupled to said switch device for causing said switch device to switch to said one operating state at a selected point on said leading edge of said periodic signal intermediate the extremities thereof;

a modulation signal source coupled to said switch device for causing said switching to selectively vary about said selected point and thereby generate an intermediate output signal having a waveform including an abrupt changing leading edge which varies both in amplitude and phase; and circuit means coupled to said switch device and being responsive to said intermediate output signal to pass the high frequency components of said waveform as an output signal to said receiver, said output signal having a harmonic frequency component at every channel which is both simultaneously amplitude modulated and frequency modulated.

2. The circuit as defined by claim 1 wherein said modulation signal source comprises an audio signal source generating an output signal of a predetermined waveform.

3. The circuit as defined by claim 1 wherein said circuit means responsive to said intermediate output signal comprises a high pass filter.

4. The circuit as defined by claim 1 wherein said circuit means responsive to said intermediate output signal comprises differentiator circuit means.

5. The circuit as defined by claim 4 wherein said differentiator circuit means comprises a resistor-capacitance network having a predetermined RC time constant.

6. The circuit as defined by claim 1 wherein said circuit means providing a periodic signal comprises a signal source providing a rectangular output waveform and circuit means coupled to said rectangular output waveform for selectively altering the leading and trailing edges of said waveform.

7. The circuit as defined by claim 6 wherein said circuit means for altering said waveform comprises integrator circuit means coupled between said rectangular waveform signal source and said base of said transistor.

8. The circuit as defined by claim 7 wherein said integrator circuit means includes resistance and capacitance means having a predetermined RC time constant.

9. The circuit as defined by claim 1 wherein said electronic switch device comprises a semiconductor switch device.

10. The circuit as defined by claim 9 wherein said semiconductor switch device comprises a transistor having a base, collector and emitter, and wherein said periodic signal is coupled to said base, said bias means and modulation signal source is coupled to said emitter, and wherein said intermediate output signal appears at said collector.

11. The circuit as defined by claim 10 wherein said bias means comprises a voltage divider network coupled between a source of supply voltage and ground potential and having a circuit junction connected to the emitter of said transistor, wherein said circuit junction has a voltage value approximately one half of the magnitude of said supply potential.

12. The circuit as defined by claim 11 wherein said transistor is normally non-conductive in said first operating state and being driven into said second operating state which comprises the conductive state.

* * * * *